United States Patent Office 3,318,857
Patented May 9, 1967

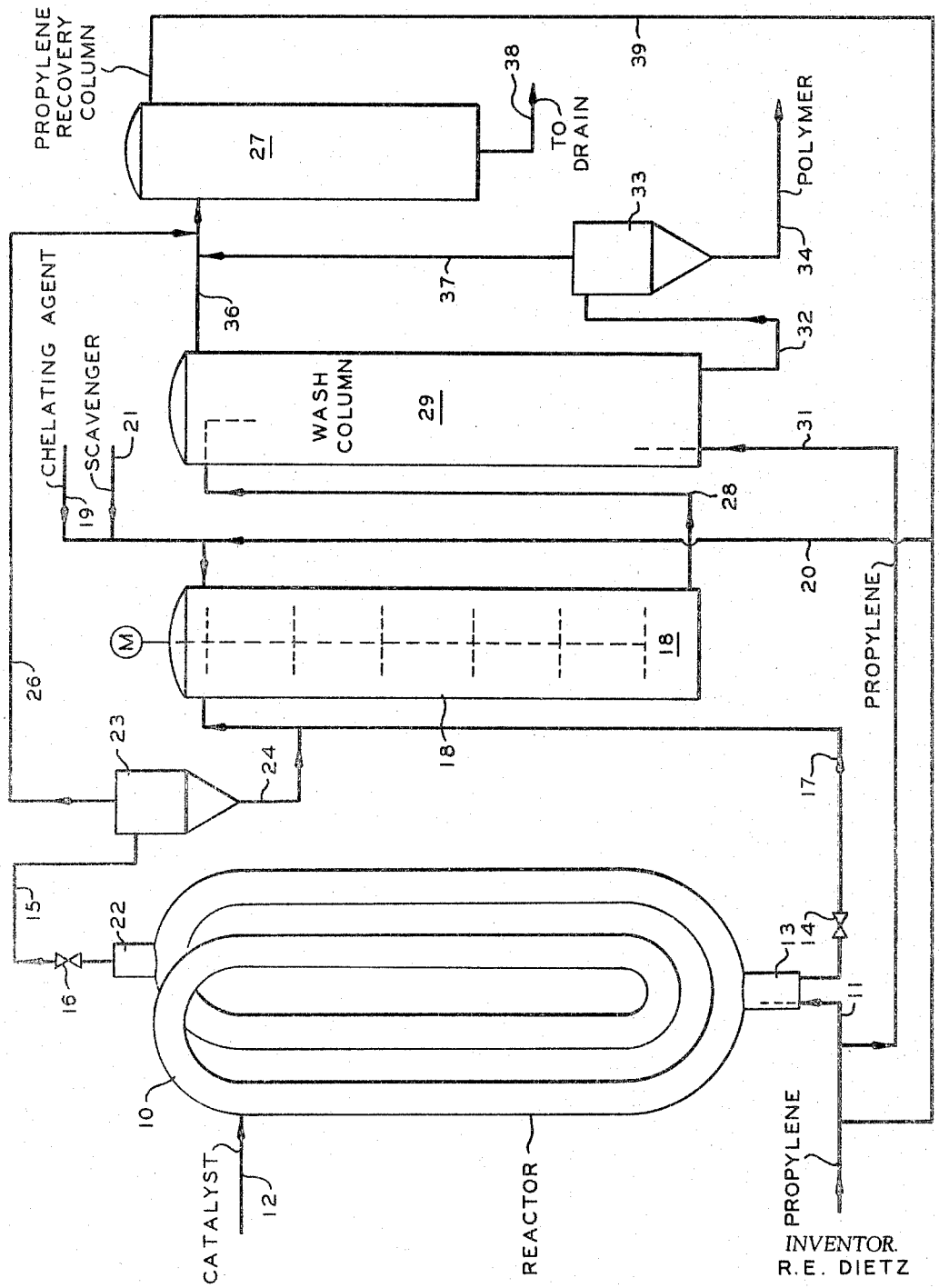

3,318,857
POLYMERIZATION ZONE EFFLUENT TREATMENT
Richard E. Dietz, Bartlesville, Okla., assignor to Phillips Petroleum Company, a corporation of Delaware
Filed May 24, 1963, Ser. No. 283,009
4 Claims. (Cl. 260—93.7)

This invention relates to a process for treating the effluent from a polymerization zone for the purification of solid polymer produced therein.

In the polymerization of 1-olefins to solid polymers using heterogeneous catalyst systems, for example, in the polymerization of propylene in the presence of titanium trichloride and diethylaluminum chloride, the polymer product will contain greater or lesser amounts of metallic residues from the catalyst and of low molecular weight polymer, both of which are detrimental to the properties of the finished polymer. "Low molecular weight polymer" is polymer soluble in normal pentane at room temperature.

In a preferred procedure for conducting such polymerizations the reaction is conducted in a mass system in which a portion of the monomer serves as the diluent and the polymer is formed as a pulverulent solid. Removal of catalyst residues has heretofore been effected by treating the reaction effluent with a chelating agent such as a β-diketone, typified by acetylacetone, and extracting low molecular weight polymer with a hydrocarbon. When so operating the chelating agent must be used in an amount sufficient to remove metal contaminants from the polymer and from the liquid effluent. Furthermore, low molecular weight polymer dissolved in the liquid effluent from the polymerization are carried into the purification system therewith.

I have found that significant advantages are realized by removing effluent from the polymerization in two separate streams, one comprising liquid constituents which is conveyed directly to a solvent recovery system, the other comprising solid polymer carried in diluent to integrated catalyst residue removal and soluble polymer extraction treatments from which clean polymer is recovered and wash liquids are sent to the solvent recovery system.

Thus, the primary object of this invention is to provide an improved process of polymer recovery wherein two streams are removed from the reaction zone. Such operation reduces the amount of the chelating agent required because none is wasted by reaction with metal residues in the liquid stream removed from the reaction zone. Other objects and advantages will be apparent to one skilled in the art upon reading this disclosure which includes:

A drawing, showing in schematic form, apparatus which can be used to practice the invention.

Broadly, the invention can be described as a polymerization process for the polymerization of olefinic hydrocarbon monomers in the presence of an initiator obtained by mixing an organometal compound with a transition metal compound, comprising introducing the monomer and the initiator into a reaction zone, removing a slurry of solid polymer from said reaction zone, said solid polymer containing transition metal residue and low molecular weight polymer, treating said slurry to remove transition metal residue and low molecular weight polymer therefrom, and removing liquid free of solid polymer from said reaction zone. Further details include contacting the polymer slurry with a chelating agent to remove transition metal residue therefrom, washing the solid polymer with an additional portion of the monomer to extract low molecular weight polymer therefrom, and passing the liquid removed from the reaction zone and the wash liquid to a purification zone. A scavenger can be used to react with hydrogen halide formed as a result of the treatment with the chelating agent.

The operation of the present process will be more fully understood from a description of the accompanying drawing in which is shown one embodiment of the invention. Tubular reactor 10 is fed with liquid propylene introduced via line 11 and catalyst, e.g., titanium trichloride and diethylaluminum chloride, through line 12. The temperature in the reaction zone is established at a level in the range between about 100 and 150° F. As the polymerization proceeds, solid polymer collects in settling leg 13. Valves 14 and 16 are operated by a cyclic timing device (not shown) in a manner such that they are opened periodically at alternate intervals. When valve 14 is opened, incoming liquid feed from line 11 forces solid polymer from settling leg 13 through line 17 into column 18 where it is intimately mixed with a chelating agent such as acetylacetone introduced via line 19 and a scavenger such as propylene oxide via line 21.

The scavenger is added because the reaction of the chelating agent with halogen-containing catalyst residues from the polymer evolves hydrogen halide. For example, when using titanium trichloride, three moles of hydrogen chloride are evolved for each atom of titanium present. Corrosion is reduced when using the scavenger to react with the hydrogen chloride.

Alternately, valve 16 is opened to release liquid effluent from extension 22 into line 15. In this line cyclone 23 operates to remove any entrained solid polymer, such solid polymer being conveyed via line 24 into line 17 in which polymer product is passed to the purification zone. Liquids passed through cyclone 23 are carried by line 26 to propylene recovery column 27. This liquid stream contains in solution soluble residues from reactor 10, such residues including soluble polymer and residual diethylaluminum chloride from the catalyst.

In column 18, metals contained in the polymer are removed as chelates by the acetylacetone. From column 18 the polymer stream is passed via line 28 to wash column 29 in which it is contacted countercurrent with incoming propylene from line 31. Washed polymer is conveyed through line 32 to cyclone 33 from which it is passed to finishing operations through line 34. Wash liquid containing extracted soluble polymer and chelated metals removed from the polymer is removed from column 29 through line 36 to column 27. Propylene removed in cyclone 33 is also passed by way of line 37 to column 27.

The various liquid streams, 26, 36, and 37, are then passed to propylene recovery column 27. Here soluble polymers and catalyst residues are removed and passed from the system through line 38. Recovered propylene from this zone is recycled to the process through line 39.

*Example*

In a run made according to the procedure described herein using equipment as shown in the diagram, assuming steady state operation, the following conditions and material balances are maintained.

To reactor 10, having a volume of 100 gallons, liquid propylene is charged via line 11 at a rate of 36.1 gallons/hour. Residence time in reactor 10 is 3 hours and temperature is 130° F. Catalyst is introduced via line 12 by flushing with liquid propylene. Catalyst charges used are 0.053 pound/hour of the reaction product of $TiCl_4$ and aluminum having the approximate formula $3TiCl_3 \cdot AlCl_3$ and 0.1 pound/hour diethylaluminum chloride, each being added with 0.45 gallon/hour of propylene. Reactor contents at steady state comprise about 35 percent polymer solids.

In settling leg 13 solid polymer accumulates and is expelled at 2-minute intervals by the operation of valve 14, being carried out by incoming propylene from line 11. Volume removed in each cycle is 0.556 gallon of slurry comprising 65 percent polymer solids, thus providing a flow of 16⅔ gallons/hour in line 17. Valve 16 is also operated in a 2-minute cycle, opening alternately to valve 14 and discharging 0.556 gallon per cycle, producing a flow of 16⅔ gallons/hour in line 23. Polymer fines in stream 23 are removed in cyclone 28 and conveyed via line 24 to line 17 in which they are combined with polymers contained therein. The polymer-free stream in line 26 flows to recovery zone 27 at a rate of 16⅔ gallons/hour.

In contactor 18 the polymer-containing stream from line 17 is combined with 17 gallons per hour of propylene from line 20, and from line 19, 0.27 pound/hour acetylacetone (7 mols per atom of metal in the titanium trichloride complex), and from line 21, 0.075 pound/hour of propylene oxide (1.2 mols per atom of chlorine in the complex), the latter being a scavenger from hydrogen chloride, i.e., the HCl formed by reaction of the acetylacetone and the catalyst complex reacts with the propylene oxide. Temperature in the contactor is maintained at 140° F. and residence time is 45 minutes. The effluent stream from contacting zone 18 is transferred at a rate of 33.7 gallons/hour via line 28 to wash zone 29 where it is contacted by countercurrent flowing propylene introduced from line 31 at 14.3 gallons/hour, temperature of the incoming stream being 130° F. From the bottom of vessel 29 a stream comprising 60 percent polymer solids is removed via line 32 at 16⅔ gallons/hour and passed to cyclone separator 33 from which 53.2 pounds/hour of polypropylene containing less than 10 p.p.m. titanium residues is recovered through line 34. Streams 26 (16⅔ gallons/hour), 37 (9.5 gallons/hour), and 36 (31.3 gallons/hour) are combined and passed to propylene recovery column 27. Purified propylene is returned via line 39 to the process and bottoms comprising soluble polymers, catalyst residues, etc., are removed through line 38 at about 0.5 gallon/hour.

Using the initiator system as set forth in this example and the recovery system of my invention decreases the amount of acetylacetone required by about 65 percent and the amount of propylene oxide by about 35 percent.

The amount of liquid removed with the solid product can be varied from that shown above. The minimum amount is that which will give a slurry which can be handled. The 65 percent solids is near the upper limit with the particular polymer. The advantage of the invention can still be obtained in the above example by taking as much as 25 gallons per hour out through line 17, thus giving 43 percent solids in the slurry.

While in the foregoing description of the invention, emphasis has been directed to the treatment of polypropylene prepared in the presence of a titanium trichloride complex-diethylaluminum chloride catalyst system, the process is also applicable to the treatment of polymers of other olefins and to the use of other heterogeneous catalyst systems comprising a combination of a compound of a metal of Group IV, V, VI, or VIII of the Periodic System with an organo compound of a metal of Group I, II or III. Likewise such polymerizations can and often preferably are conducted in the presence of elemental hydrogen.

In other words, the invention is useful in the recovery of polymers of alpha olefins from a polymerization process over an organometallic catalyst system. Ordinarily, these alpha olefins will have from 3 to 6 carbon atoms per molecule such as propylene, 1-butene, 1-pentene, 4-methyl-1-pentene, 3-methyl-1-butene, 3,3-dimethyl-1-butene, and the like. In the organometallic catalyst systems which are used in the processes to which the invention is preferably directed, the organometal employs a non-transition metal of Groups I, II, or III of the Periodic System; for example, aluminum, beryllium, zinc, magnesium, lithium, or sodium in which the metal is attached to at least one hydrocarbon radical and the remaining valences, if any, are satisfied by halogen or hydrogen. Complex alkyls of aluminum and alkali metals, for example, lithium aluminum tetrapropyl, are sometimes used. Of these catalysts, preferred are the dialkylaluminum chlorides or bromides in which the alkyl radicals have from 1 to 8 carbon atoms. In the catalyst system, the organometal is used with a transition metal compound such as the halides of the Groups IV to VI metals, for example, titanium, vanadium, zirconium, hafnium, thorium, uranium, niobium, tantalum, chromium, molybdenum or tungsten. Of these, the chlorides of titanium are preferred and titanium trichloride is the best in the polymerization of propylene. The extraction method of the invention is particularly useful for the removal of catalyst such as diethylaluminum chloride and titanium trichloride. Preferably, the polymerization is carried out in the liquid monomer although an inert diluent can be employed. Temperatures in the range of about 0 to 250° F. and residence times of about 1 to 15 hours are preferred for the polymerization of alpha olefins such as propylene. The catalyst is used in a weight ratio of about 0.5:1 to 20:1, preferably about 1:1 to 4.5:1 TiCl₃ to dialkylaluminum halide.

The diketones used in treating the polymer according to this invention contain the group:

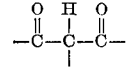

Such materials are those selected from the group consisting of (a) compounds of the general formula:

(a) 

and (b) compounds of the general formula:

(b) 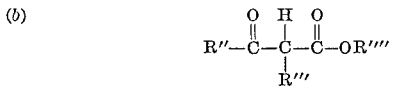

In compound (a) each R can be an alkyl, cycloalkyl, aryl, aralkyl, alkaryl, alkylcycloalkyl, or cycloalkylalkyl group or the R's can be joined to form a cyclic structure and R' can be hydrogen or an alkyl, cycloalkyl, aryl, alkaryl, aralkyl, alkylcycloalkyl, cycloalkylalkyl group, the number of carbon atoms in each R and R' being from 1 to 8.

In compound (b) R'' is an alkyl, cycloalkyl, aryl, aralkyl, alkaryl, alkylcycloalkyl, cycloalkylalkyl group or an OR'''' group; R''' is hydrogen or a hydrocarbon group as defined for R''; and R'''' is a hydrocarbon group as defined for R'', the number of carbon atoms in R'', R''', and R'''' being from 1 to 8.

Typical of such components are 2,4-pentanedione (acetylacetone), 2,4-hexanedione, 2,4-heptanedione, 5-methyl-2,4-hexanedione, 2,4-octanedione, 5,5-dimethyl-2,4-hexanedione, 3-ethyl-2,4-pentanedione, 2,2-dimethyl-3,5-nonanedione, 1-cyclohexyl-1,3-butanedione, 5,5-dimethyl-1,3-cyclohexanedione, 1-phenyl-1,3-butanedione, 1-(4-biphenylyl)-1,3-butanedione, 1-phenyl-1,3-pentanedione, 1-phenyl-5,5-dimethyl-2,4-hexanedione, 1,3-diphenyl-1,3-propanedione, 1,4-diphenyl-1,3-butanedione, 1-phenyl-2-benzyl-1,3-butanedione, 1-phenyl-3-benzyl-9,11-nonadecanedione, 8,10-heptadecanedione, 8-ethyl-7,9-heptadecanedione, 6-octyl-5,7-undecanedione, 4-phenyl-3,5-heptanedione, 1,3-cyclohexanedione, ethyl acetoacetate, methyl acetoacetate, n-propyl acetoacetate, isopropyl acetoacetate, tert-butyl acetoacetate, diethyl malonate, dimethyl malonate, di-n-propyl malonate, diisopropyl malonate, di-tert-butyl malonate, octyl acetoacetate, heptyl acetoacetate, phenyl acetoacetate, diphenyl malonate, dicyclohexyl malonate, dicyclohexyl octylmalonate, dihexyl phenylmalonate, ethyl 3-oxopentanoate, octyl-3-oxoundecanoate, methyl 3-oxo-4-phenylbutanoate, ethyl 3-oxo-5-phenylpentanoate, octyl 3-oxo-2-phenylundecanoate, octyl 3-oxo- 2-octylundecanoate, cyclohexyl 3-oxo-6-cyclopentylhexanoate, and the like.

Of the various compounds represented by these formulas, acetylacetone and ethyl acetoacetate are preferred.

As the other component, the scavenger, one can use compounds containing from 2 to 8 carbon atoms and which include in their molecular structure at least one oxirane group having the structure

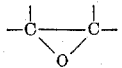

These compounds can be represented by the general formula:

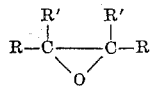

in which each R and each R' can be a hydrogen atom, an alkyl, cycloalkyl, or aryl group, or an epoxy-containing cyclic or alicyclic hydrocarbon group; and in which the R groups can be joined to form a carbocyclic group. Halogen substituted derivatives of these compounds can also be used.

Typical compounds of this type include: epoxyethane, 1,2-epoxypropane, 1,2-epoxybutane, 2,3-epoxybutane, 1,2:3,4-diepoxybutane, 1,2:4,5-diepoxypentane, 1,2:4,5:-7,8-triepoxyoctane, 2,3-epoxy-2,3-dimethylbutane, 2,3-epoxy-2-methyl-3-ethylpentane, epoxyethylbenzene, epoxyethylcyclohexane, epoxyethyl-3,4-epoxycyclohexane, 1,2-epoxycyclohexane, 2,3-epoxyethylcyclohexane, 1,2-epoxycyclopentane, and the like.

For complete removal of the catalyst residue, the amount of dicarbonyl compound used will be at least the stoichiometric amount to react with the metal in the insoluble portion of the catalyst, calculated on the basis of $m/2$ mols per atom of metal, where $m$ is the coordination number of the metal. For titanium and aluminum the coordination number is 6. An excess can be used. Thus, when using the reaction products of $TiCl_4$ and aluminum having the approximate formula $3TiCl_3 \cdot AlCl_3$, 12 mols of dicarbonyl compound would be used (4-metal atoms x 3 mols dicarbonyl compound per metal atom) per mole of the reaction product. An excess, up to 3 or 4 times this amount, is frequently desirable.

Likewise, for complete removal of the amount of alkylene oxide should be at least the stoichiometric amount to react with the halogen in the insoluble portion of the catalyst (i.e., one mol per atom of halogen) although, again, an excess can be used. The range of 1 to 5 mols per atom of halogen is preferred.

As many possible embodiments can be made of this invention without departing from the scope thereof, it is to be understood that all matter herein set forth is to be interpreted as illustrative and not as unduly limiting the invention.

I claim:

1. A mass polymerization process for the polymerization of olefinic hydrocarbon monomers in the presence of an initiator obtained by mixing an organometal compound with a transition metal compound, comprising introducing the monomer and the initiator into a tubular reaction zone, removing a slurry concentrated in solid polymer from the lower end portion of said tubular reaction zone, said solid polymer containing transition metal residue and low molecular weight polymer, removing liquid monomer containing organometal compound dissolved therein and unavoidably containing a small amount of solid polymer from the upper end portion of said tubular reaction zone, separating solids from liquid in said monomer stream in a separation zone, combining a solids stream from said separation zone with said slurry of solid polymer from said tubular reaction zone, contacting said polymer slurry with a chelating agent to remove transition metal residue therefrom, washing the solid polymer with an additional portion of the monomer to extract low molecular weight polymer therefrom, removing a liquid monomer stream containing said organometal compound dissolved therein from said separation zone and combining said liquid monomer stream with the monomer used to wash said solid polymer, the organometal compound dissolved in the monomer stream serving to neutralize any acid resulting from the reaction of said chelating agent with said transition metal residue, and passing said combined monomer stream to a recovery zone.

2. A process according to claim 1 wherein said monomer is propylene, said organometal compound is diethylaluminum chloride and said transition metal compound is the reaction product of titanium tetrachloride and aluminum.

3. The process of claim 1 in which a hydrogen chloride scavenger is used in combination with said chelating agent.

4. The process of claim 3 in which said chelating agent is acetylacetone and said scavenger is propylene oxide.

References Cited by the Examiner

UNITED STATES PATENTS

| 2,974,132 | 3/1961 | Jacobi | 260—94.9 |
| 2,978,443 | 4/1961 | Goldtrap | 260—94.9 |
| 3,098,845 | 7/1963 | Cull et al. | 260—94.9 |
| 3,167,536 | 1/1965 | Zampachova et al. | 260—94.9 |
| 3,216,986 | 11/1965 | Fritz et al. | 260—94.9 |
| 3,272,787 | 9/1966 | Scoggin et al. | 93.7 |

JOSEPH L. SCHOFER, *Primary Examiner.*

L. EDELMAN, *Assistant Examiner.*